United States Patent
Kistner

(10) Patent No.: US 11,108,862 B2
(45) Date of Patent: Aug. 31, 2021

(54) BI-DIRECTIONAL DATA SYNC BETWEEN A CLIENT DEVICE AND AN APPLICATION SERVER

(71) Applicant: Journey Mobile, Inc., Denver, CO (US)

(72) Inventor: Ralf Kistner, Stellenbosch (ZA)

(73) Assignee: Journey Mobile, Inc., Denver, CO (US)

( * ) Notice: Subject to any disclaimer, the term of this patent is extended or adjusted under 35 U.S.C. 154(b) by 0 days.

(21) Appl. No.: 17/026,623

(22) Filed: Sep. 21, 2020

(65) Prior Publication Data
US 2021/0112121 A1 Apr. 15, 2021

Related U.S. Application Data

(60) Provisional application No. 62/914,764, filed on Oct. 14, 2019.

(51) Int. Cl.
*G06F 15/16* (2006.01)
*H04L 29/08* (2006.01)
*H04L 29/06* (2006.01)

(52) U.S. Cl.
CPC .......... *H04L 67/1095* (2013.01); *H04L 67/02* (2013.01); *H04L 67/14* (2013.01); *H04L 67/42* (2013.01); *H04L 69/329* (2013.01)

(58) Field of Classification Search
CPC ... H04L 67/1095; H04L 69/329; H04L 67/02; H04L 67/14; H04L 67/42
See application file for complete search history.

(56) References Cited

U.S. PATENT DOCUMENTS

| | | | |
|---|---|---|---|
| 5,926,816 A | 7/1999 | Bauer et al. | |
| 6,578,054 B1 * | 6/2003 | Hopmann | G06Q 10/107 707/625 |

(Continued)

OTHER PUBLICATIONS

Alpha Software, "Alpha Software Awarded Patent for Award-Winning, Offline Mobile Capabilities", Dec. 18, 2019, 3 pages.

(Continued)

*Primary Examiner* — Cheikh T Ndiaye
(74) *Attorney, Agent, or Firm* — Cook Law Office; Carmen C. Cook

(57) ABSTRACT

A bi-directional data synchronization system and method is provided to facilitate data communication and synchronization between a remote client device and an application server. In one embodiment, a method in a client device executing a mobile application where the client device is in communication with the application server over a network connection having unreliable network connectivity includes storing in a first table at the client device data associated with at least one data bucket designated to the client device, the data associated with the data bucket being a subset of data associated with the mobile application; in response to the network connection not being established, storing in a second table at the client device changes to the data in the first table as a result of the executing; and in response to the network connection being established, performing synchronization of data with the application server.

17 Claims, 13 Drawing Sheets

(56) References Cited

U.S. PATENT DOCUMENTS

| | | | |
|---|---|---|---|
| 7,032,033 B1* | 4/2006 | Ledoux | H04L 67/1095 |
| | | | 709/248 |
| 7,136,999 B1 | 11/2006 | Griffiths | |
| 7,177,950 B2 | 2/2007 | Narayan et al. | |
| 7,970,017 B2 | 6/2011 | O'Neil | |
| 8,285,642 B2 | 10/2012 | Cesarini et al. | |
| 8,868,500 B2 | 10/2014 | Giampaolo et al. | |
| 9,773,051 B2* | 9/2017 | Smith | G06F 16/1824 |
| 9,811,548 B2 | 11/2017 | Stigsen et al. | |
| 9,872,174 B2 | 1/2018 | Chen et al. | |
| 9,992,094 B1 | 6/2018 | Singh | |
| 10,547,679 B1* | 1/2020 | Burnett | H04L 67/1095 |
| 2004/0209629 A1 | 10/2004 | Virolainen et al. | |
| 2006/0026168 A1* | 2/2006 | Bosworth | H04L 67/1095 |
| 2006/0056336 A1 | 3/2006 | Dacosta | |
| 2006/0168308 A1 | 7/2006 | Celi et al. | |
| 2007/0078950 A1* | 4/2007 | Hopkins | H04L 67/02 |
| | | | 709/217 |
| 2008/0189439 A1* | 8/2008 | Chitre | H04L 67/1095 |
| | | | 709/248 |
| 2008/0222212 A1 | 9/2008 | Prasad et al. | |
| 2009/0037523 A1 | 2/2009 | Kolke et al. | |
| 2009/0172201 A1 | 7/2009 | Carmel | |
| 2009/0247134 A1* | 10/2009 | Jeide | H04L 67/1095 |
| | | | 455/414.2 |
| 2009/0259744 A1 | 10/2009 | Kolke et al. | |
| 2012/0260296 A1 | 10/2012 | Mallet et al. | |
| 2017/0131978 A1 | 5/2017 | Iyer et al. | |
| 2017/0177687 A1* | 6/2017 | Ritter | G06F 16/93 |
| 2018/0246704 A1 | 8/2018 | Rabins et al. | |
| 2019/0324826 A1* | 10/2019 | Abuelata | G06F 3/048 |

OTHER PUBLICATIONS

Pillir EdgeReady Cloud, "Work from any location, on any device, with no connectivity for any length of time," https://www.pillir.io/offline-capability, printed Aug. 29, 2020, 7 pages.

International Search Report and Written Opinion, Application No. PCT/US20/52352, dated Feb. 2, 2021, pp. 1-9.

\* cited by examiner

Universal Data Model (UDM)

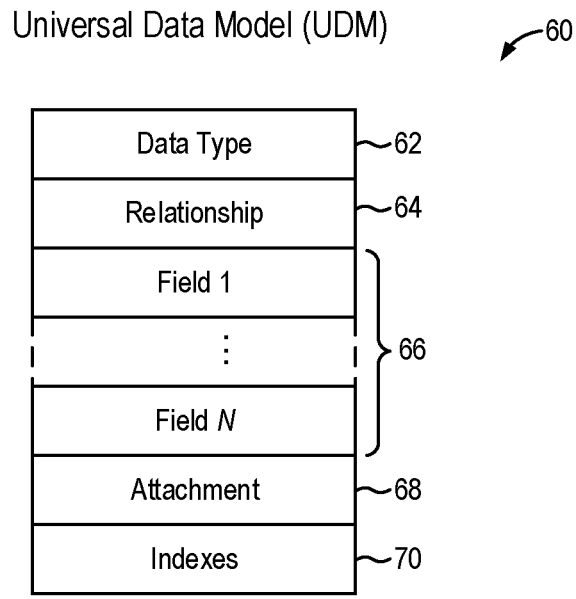

Figure 4

Data Model Example

```
<model name="asset" label="Asset">
  <!-- Plain fields -->
  <field name="serial_number" label="Serial Number" type="text" />
  <field name="quantity" label="Make / Brand" type="number" />

<!-- Attachment references -->
  <field name="photo" label="Photo" type="photo"/>

<!-- Object relationships -->
  <belongs-to model="region" />
  <belongs-to model="category" />

<has-many model="part" name="parts" />
</model>
```

Figure 5

Sync Rules Example

```
Global bucket: one global bucket to sync all data, to all users.

<global-bucket>
    <all-models />
</global-bucket>

Global bucket: Include the bucket for each user that has a role of
"technician". In the bucket, include "model1" and "model2". For
"model1", only include objects that have not been archived.

<global-bucket via="user[role == 'technician']">
    <model name="model1" condition="archived != true" />
    <model name="model2" />
</global-bucket>

Normal bucket: One per region. For each user, sync the bucket for the
user's region. In the bucket, include all "asset", "job" and
"categories" objects in the region.

<bucket via="user/region">
    <has-many name="asset" condition="archived != true" />
    <has-many name="job" condition="archived != true" />
    <has-many name="categories" />
</bucket>
```

Figure 6

| Raw data - separate table per model, e.g. "assets" | | |
|---|---|---|
| Column | Description | Example |
| ID | Unique Object ID | "3306e1af-0412-42f7-bd9d-974330a2823c" |
| Data | JSON string containing the fields, relationships and attachment references | {<br>  serial: "A23455",<br>  quantity: 7,<br>  region_id: "9f34b44c-9cb8-445b-9f80-550ddb6e7ea4",<br>  photo_id: "bd720cd4-9e90-4af8-bcfb-a31756bf1775"<br>} |

Figure 8

On Application Server

| Oplog table | | |
|---|---|---|
| An entry is added whenever an object in a "raw data" table is modified. | | |
| Column | Description | Example |
| Sequence ID | Incrementing number, as received from the server | 6009123137931706000 |
| ID | Object ID. Each object may have multiple entries in the oplog table. | "3306e1af-0412-42f7-bd9d-974330a2823c" |
| Type | Name of the model of the object | "asset" |
| Op | PUT or DELETE | PUT |
| Data | JSON string containing the fields, relationships and attachment references | {<br>  serial: "A23455",<br>  quantity: 7,<br>  region_id: "9f34b44c-9cb8-445b-9f80-550ddb6e7ea4",<br>  photo_id: "bd720cd4-9e90-4af8-bcfb-a31756bf1775"} |

Figure 9

On Application Server

| Sync table | | |
|---|---|---|
| Column | Description | Example |
| Sequence ID | Incrementing number, as received from the server | 6009123137931706000 |
| ID | Unique Object ID | "3306e1af-0412-42f7-bd9d-974330a2823c" |
| Type | Name of the model of the object | "asset" |
| Op | PUT or DELETE | PUT |
| Hash | Calculated based on the data. | 6b6965334e656167 |
| Buckets | List of buckets that the object is present in | ["global", "region_co"] |
| Historical Buckets | List of buckets that the object has ever been present in, to keep track of objects removed from buckets. | ["global", "region_co", "region_tx"] |
| Data | JSON string containing the fields, relationships and attachment references | {<br>  serial: "A23455",<br>  quantity: 7,<br>  region_id: "9f34b44c-9cb8-445b-9f80-550ddb6e7ea4",<br>  photo_id: "bd720cd4-9e90-4af8-bcfb-a31756bf1775"} |

Figure 10

On Client Device

| Object data table | | |
|---|---|---|
| Column | Description | Example |
| ID | Unique Object ID | "3306e1af-0412-42f7-bd9d-974330a2823c" |
| Type | Name of the model of the object | "asset" |
| Sequence ID | Incrementing number, as received from the server | 6009123137931706000 |
| Hash | As received from the server | 6b6965334e656167 |
| Data | JSON string containing the fields, relationships and attachment references | {<br>  serial: "A23455",<br>  quantity: 7,<br>  region_id: "9f34b44c-9cb8-445b-9f80-550ddb6e7ea4",<br>  photo_id: "bd720cd4-9e90-4af8-bcfb-a31756bf1775"} |

Figure 11

On Client Device

| CRUD queue table | | |
|---|---|---|
| Column | Description | Example |
| ChangeID | Local auto-incrementing ID | 1043 |
| Type | Name of the model of the object | "asset" |
| ObjectID | ID of the object | "3306e1af-0412-42f7-bd9d-974330a2823c" |
| Op | Type of change (PUT, PATCH, DELETE) | PATCH |
| Data | JSON string containing the changed fields, relationships and attachment references | {<br>  quantity: 8<br>} |

Figure 12

Pseudocode for Sync-Bucket-Diff

```
buckets_before = unchanged | remove
bucket_after = unchanged | add
had_before = not_empty? (object_buckets & buckets_before)
has_after = not_empty? (object_buckets & buckets_after)
if had_before and not has_after: remove object
if not had_before and has_after: add object
```

Figure 14

Pseudocode for Sync-Bucket-Cleanup

```
in_removed_bucket = not_empty? (all_object_buckets & removed)
in_current_bucket = not_empty? (all_object_buckets & unchanged)
if in_removed_bucket and not in_current_bucket: remove object
```

Figure 15

Client Device Data Query

```
// All objects
DB.asset.all();
// Only non-archived assets:
DB.asset.where("archived != ?", true)
// Sort, limit and skip
DB.asset.where("archived != ?", true).orderBy("region",
"updated_at").skip(200).limit(100)
// Multiple conditions
DB.user.where("username = ? and (password = ? or token = ?)",
username, password, token)
// Query directly against the backend (via REST API), instead of
the locally synced database:
OnlineDB.user.where("username = ?", username)
```

Figure 17

BI-DIRECTIONAL DATA SYNC BETWEEN A CLIENT DEVICE AND AN APPLICATION SERVER

CROSS REFERENCE TO RELATED APPLICATIONS

This application claims priority to U.S. Provisional Patent Application No. 62/914,764, entitled bi-directional data sync between A client device and an application server, filed Oct. 14, 2019, which is incorporated herein by reference for all purposes.

FIELD OF THE INVENTION

The invention relates to synchronization of data between a client device and an application server and, in particular, to a method to enable a client device to perform database queries and update tasks while off-line, and synchronize with the application server when back on-line.

BACKGROUND OF THE INVENTION

Software application (also sometimes referred to as an "application" or an "app") is a computer program designed to execute on a computing platform or a mobile processing platform such as a smart phone, a tablet computer, a laptop computer, or other computing devices. Applications that are designed to execute on a mobile processing platform are sometimes referred to as mobile applications or mobile apps. In a setting in which an application executing on a computing device is used within the context of an enterprise, the application is typically connected to resources of the enterprise (e.g. enterprise databases) through a data network, typically a wireless network.

One common concern for applications is how to operate the application when the network connection is weak or is entirely absent. That is, the mobile device on which the mobile application operates is "disconnected from" (i.e. is without access to) the data network. For example, remote workers often need access to the centralized data of the enterprise while in the field where the remote workers may not necessarily have any network connectivity at the time. Additionally, remote workers need to be able to record data, which, at a later point, must be consolidated with the centralized database of the enterprise. To meet the demand for offline operation, applications implement certain data synchronization techniques to facilitate data access and data collection by the application during offline operation. Developing applications that support offline operation often requires a large amount of work, with custom logic for each data type, and the application often does not scale well.

Existing data synchronization ("data sync") methods typically fall into one of two categories: (1) custom caching logic per data type, or (2) a specialized replicated database.

In some cases, an application implements custom caching logic per data type which provides a way to cache data offline by specifying caching and/or refresh logic for separate data sets. There are some shortcomings for using the caching method for data synchronization. First, custom application development is required for each data type. The developer must choose between using the cached data, or executing a query against the server when online. Second, the entire dataset is typically downloaded on each refresh, without an efficient incremental update system. Therefore, there is nothing to guarantee the downloaded dataset is up to date.

In other cases, an application implements specialized replicated database where a replica of the centralized database is kept on the remote device. Replicating the centralized database for providing data sync has some shortcomings. First, the replicated database typically has a non-standard query and update interface, requiring more effort to work with than a regular relational or document database. Second, the entire database is typically replicated, with no way to select which subset of data to sync to a specific user.

BRIEF DESCRIPTION OF THE DRAWINGS

Various embodiments of the invention are disclosed in the following detailed description and the accompanying drawings.

FIG. 4 illustrates a representation of the universal data model in some examples of the present disclosure.

FIG. 5 illustrates a universal data model defined in XML in one example of the present disclosure.

FIG. 6 illustrates a set of sync rules defined in XML, in examples of the present disclosure.

FIG. 8 illustrates a data table for storing the raw data in some examples.

FIG. 9 illustrates an oplog table in some examples.

FIG. 10 illustrates the Sync Table implemented in the application server in some examples.

FIG. 11 illustrates the data table for storing the current states of the data objects in the client device in some examples.

FIG. 12 illustrates the CRUD queue table implemented in the client device in some examples.

FIG. 14 illustrates an example pseudocode which can be used to implement the sync-bucket-diff in embodiments of the present disclosure.

FIG. 15 illustrates an example pseudocode which can be used to implement the sync-bucket-cleanup in embodiments of the present disclosure.

FIG. 17 illustrates a client device data query defined in XML in one example.

DETAILED DESCRIPTION

Figure 1:
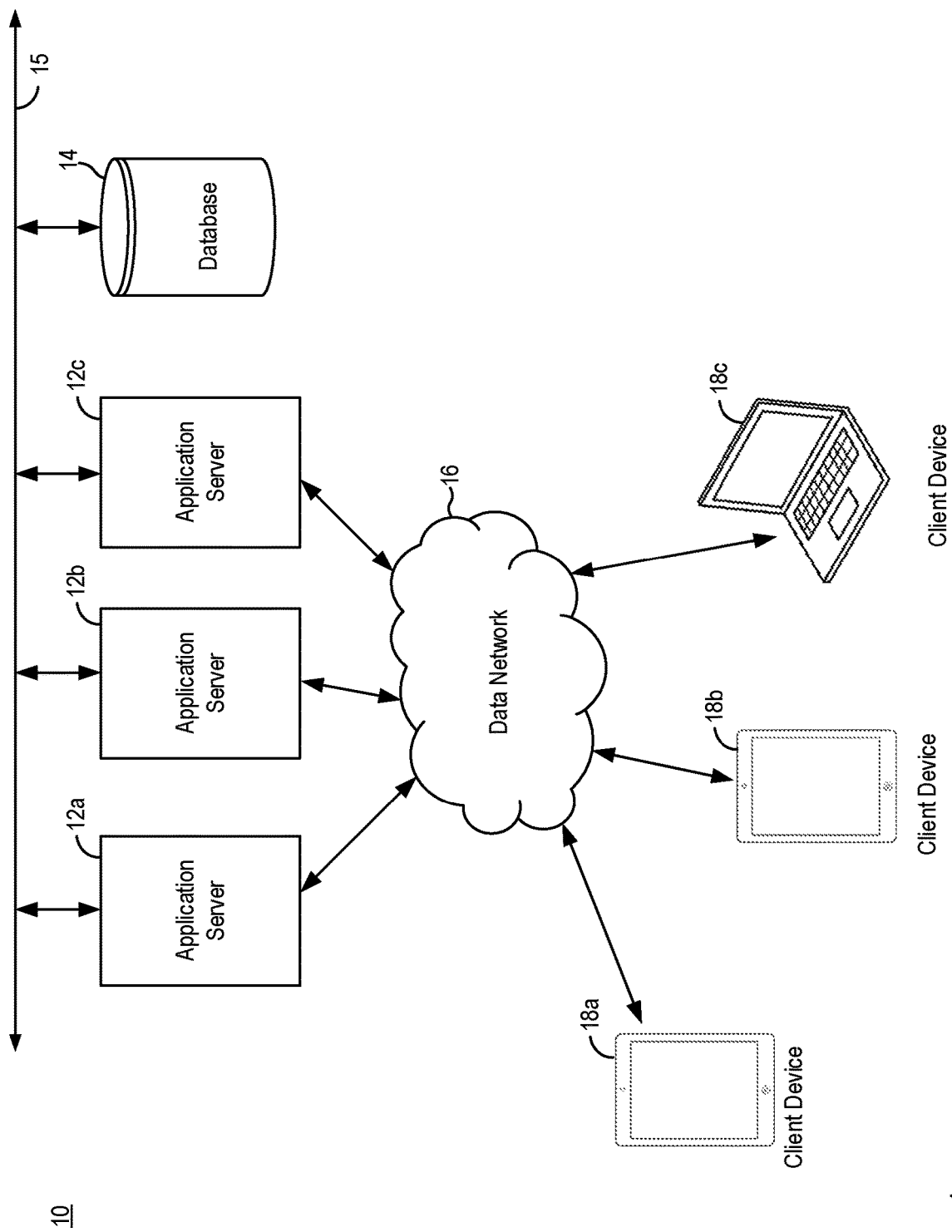
FIG. 1 illustrates an application environment in which the data sync system and method of the present disclosure can be implemented in some embodiments.

In embodiments of the present disclosure, a bi-directional data synchronization system and method is provided to facilitate data communication and synchronization between one or more remote client devices and one or more application servers. In some embodiments, the client devices execute a software application and are in communication with one or more application servers providing backend application services. The application servers are in communication with a centralized database storing application data to be used or modified by the client devices. The bidirectional data synchronization system and method realizes efficient bi-directional data synchronization between the remote client devices and the application servers, where the remote client devices may be occasionally operated offline. The bi-directional data synchronization system ensures integrity of the application data stored on the centralized database. In particular, the bi-directional data synchronization system and method can be deployed in software applications without requiring custom application development.

In embodiments of the present disclosure, the bi-directional data synchronization system and method or "data sync system and method" define buckets of data objects that are stored in the centralized database. Each bucket is assigned to certain users of the client devices or to certain groups of users of the client devices. For example, a bucket can be assigned to the client device of a field worker or a bucket can be assigned to all users in North America. A client device receives replicated dataset for one or more buckets it is assigned to. Accordingly, only a subset of the dataset in the centralized database is replicated onto the client device. The entire dataset in the centralized database need not be replicated onto each client device.

The data sync method operates to maintain the data contained in a bucket on the client device up to date. That is, the data sync method keeps the data in the bucket on the client device in sync with the same bucket of data objects on the centralized database. The data sync method continually updates the buckets for each client device when the client device has network connection. After a client device has been operated off-line, the data sync method operates to update the list of buckets that is assigned to the client and sync up data in the assigned buckets on the client device with the data of the same buckets on the centralized database.

The data sync system and method of the present invention realizes many advantageous features. First, the data sync method enables synchronizing a set of data consisting of multiple data types, without any customization or developer intervention per data type. Second, the data sync method efficiently synchronizes incremental updates in both directions (from remote client devices to the application servers and from the application servers to the remote client devices). Third, the data sync method enables the application to specify a subset of data to synchronize per user. Fourth, the data sync method performs integrity checks with automatic recovery. Lastly, in some embodiments, the data sync method exposes the central database using a SQL-like interface to facilitate the use of standard database language to communicate with the database.

FIG. 1 illustrates an application environment in which the data sync system and method of the present disclosure can be implemented in some embodiments. Referring to FIG. 1, an application environment 10 includes one or more physical or virtual servers 12 communicating with a database 14 or other forms of persistent storage. The servers 12 host the backend application services of a software application (an "application" or "an App") and are referred to as "application servers" in the present description. In the present illustration, application servers 12a, 12ba and 12c are provisioned for supporting the backend application services of the App and are collectively and individually referred to as an application server 12 in the present description. In actual implementations, one or more application servers may be provisioned depending on the requirement of the App.

The application servers 12 execute backend application services for the application and are in communication with the database 14 over a data bus 15. The database 14 stores the application data that are to be used or modified by the execution of the application. In some embodiments, the application is being executed on remote client devices 18, such as mobile phones, tablet computing devices or laptop computers, denoted as client devices 18a, 18b and 18c in FIG. 1. The remote client devices 18 communicate with the application servers 12 over a network connection, such as through a data network 16, which can include wired or wireless connections. In most cases, the client devices 18 connect to the application servers 12 through a wireless connection, such as through WiFi or through a cellular network, such as GSM or other cellular wireless network. The network connection between the client devices 18 and the application servers 12 can be unreliable, that is, the network connectivity between the client devices 18 and the application servers 12 may be weak or entirely absent. In that case, a client device 18 may be disconnected from the data network 16, that is, that client device is off-line. However, the client device 18 may still need to access application data or may need to collect or change application data during execution of the application when the client device 18 is off-line. In some embodiments, the data sync system and method of the present disclosure enables a client device that is off-line to continue to execute the application and access and modify application data. When the network connection is reestablished again, the data sync system and method facilitates synchronization of application data between the client device and the application server so that the client device and the central database both have the most up-to-date application data.

Figure 2:
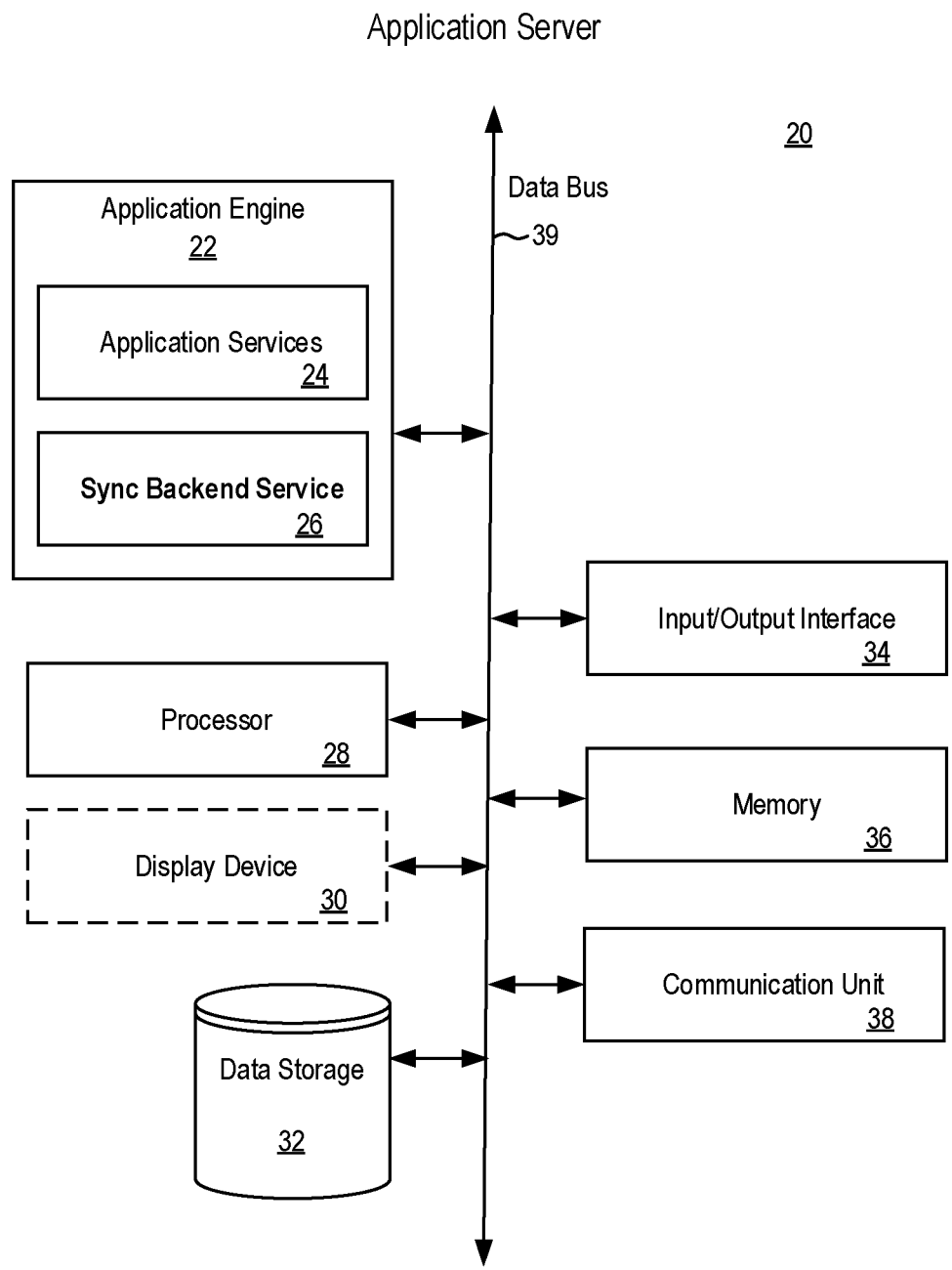
FIG. 2 is a block diagram of one embodiment of an application server according to the techniques described herein.

FIG. 2 is a block diagram of one embodiment of an application server according to the techniques described herein. In particular, FIG. 2 illustrates an example computing system which may represent the computer architecture of a computing device, computing entity, or server for implementing the application server in embodiments of the present disclosure. Referring to FIG. 2, in some embodiments, the application server 20 is implemented as a system which may also include one or more processors 28, a memory 36, an optional display device 30, a communication unit 38, a data storage 32, and an input/output device 34 according to some examples. The components of the application server 20 are communicatively coupled to a bus 39 for communication with each other. The application server 20 further includes an application engine 22 for implementing backend application services for a software application. For instance, the application engine 22 may include an application services engine 24 to execute backend application services and a sync backend service engine 26 providing service-side functions for the data sync method in embodiments of the present disclosure.

The processor 28 may execute software instructions by performing various input/output, logical, and/or mathematical operations. The processor 28 may have various computing architectures to process data signals. The processor 28 may be physical and/or virtual and may include a single processing unit or a plurality of processing units and/or cores. In some implementations, the processor 28 may be capable of generating and providing electronic display signals to a display device and other functions. In some implementations, the processor 28 may be coupled to the memory 36 via the bus 39 to access data and instructions therefrom and store data therein. The bus 39 may couple the processor 28 to the other components of the system including, for example, the memory 36, the communication unit 38, the application engine 22, and the data storage 32. It will be apparent to one skilled in the art that other processors, operating systems, and physical configurations are possible.

The memory 36 may store and provide access to data for the other components of the system. In some implementations, the memory 36 may store instructions and/or data that may be executed by the processor 28. The instructions and/or data may include code for performing the techniques described herein. For example, in one embodiment, the memory 36 may store the software application to be executed by the application server and the client devices. The memory 36 is also capable of storing other instructions and data, including, for example, an operating system, hardware drivers, other software applications, databases, etc. The memory 36 may be coupled to the bus 39 for communication with the processor 28 and the other components of the system.

The memory 36 may include one or more non-transitory computer-usable (e.g., readable, writeable) device, a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray, etc.) mediums, which can be any tangible apparatus or device that can contain, store, communicate, or transport instructions, data, computer programs, software, code, routines, etc., for processing by or in connection with the processor 28. In some implementations, the memory 36 may include one or more of volatile memory and non-volatile memory. It should be understood that the memory 36 may be a single device or may include multiple types of devices and configurations.

The display device 30 may be a liquid crystal display (LCD), light emitting diode (LED) or any other similarly equipped display device, screen or monitor. The display device 30 represents any device equipped to display user interfaces, electronic images and data as described herein. In different embodiments, the display is binary (only two different values for pixels), monochrome (multiple shades of one color), or allows multiple colors and shades. The display device 30 is coupled to the bus 39 for communication with the processor 28 and the other components of the system. It should be noted that the display device 30 is shown in FIG. 2 with dashed lines to indicate it is optional. For example, the application server may be operated without a display device.

The communication unit 38 is hardware for receiving and transmitting data by linking the processor 28 to a data network and other processing systems. In one embodiment, the communication unit 38 may include a port for direct physical connection to a data network. In another embodiment, the communication unit 38 may include a wireless transceiver (not shown) for exchanging data via a wireless network using one or more wireless communication methods, such as IEEE 802.11, IEEE 802.16, Bluetooth®, cellular communications, or another suitable wireless communication method.

The data storage 32 is a non-transitory memory that stores data for providing the functionality described herein. In the illustrated embodiment, the data storage 32 is communicatively coupled to the bus 39 to receive data for storage and provide data for retrieval upon a request for the data. The data storage 32 may store data tables and application data being processed by the application server, as will be described in more detail below.

The components of the application engine 22 may include software and/or logic to provide the functionality being perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 28. In some embodiments, the components are instructions executable by the processor 28. In some implementations, the components are stored in the memory 36 and are accessible and executable by the processor 28.

Figure 3:
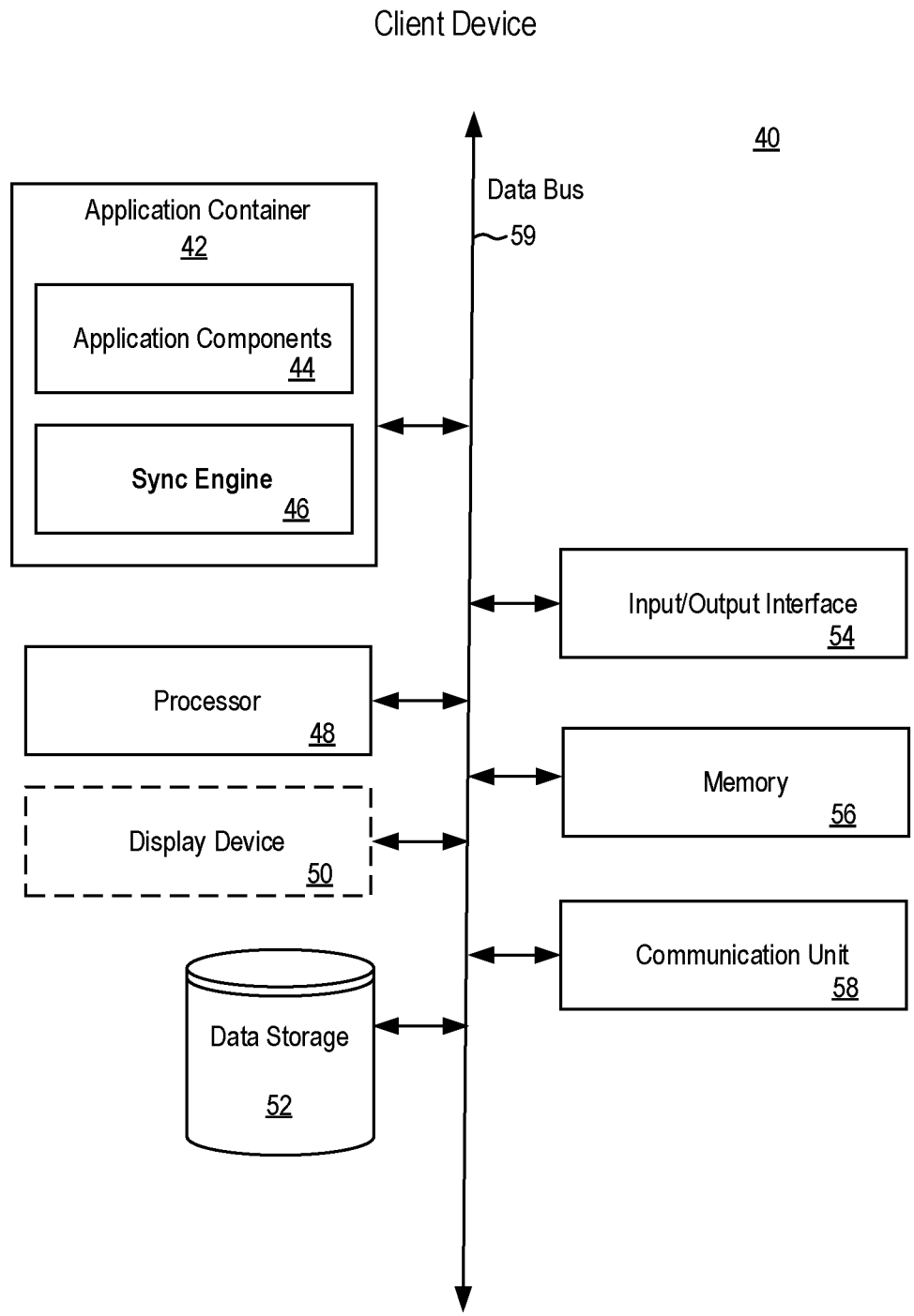
FIG. 3 is a block diagram illustrating one embodiment of a client device according to the techniques described herein.

FIG. 3 is a block diagram illustrating one embodiment of a client device according to the techniques described herein. In particular, FIG. 3 illustrates an example computing system which may represent the computer architecture of a computing device, computing entity, or server for implementing the client device in embodiments of the present disclosure. Referring to FIG. 3, in some embodiments, the client device 40 is implemented as a system which may also include one or more processors 48, a memory 56, an optional display device 50, a communication unit 58, a data storage 52, and an input/output device 54 according to some examples. The components of the client device 40 are communicatively coupled to a bus 59 for communication with each other. The client device 40 further includes an application container 42 hosting the software or software components 44 of the application. The application container 42 may also include a sync engine 46 implementing the data sync method in embodiments of the present disclosure.

The processor 48 may execute software instructions by performing various input/output, logical, and/or mathematical operations. The processor 48 may have various computing architectures to process data signals. The processor 48 may be physical and/or virtual and may include a single processing unit or a plurality of processing units and/or cores. In some implementations, the processor 48 may be capable of generating and providing electronic display signals to a display device and other functions. In some implementations, the processor 48 may be coupled to the memory 56 via the bus 59 to access data and instructions therefrom and store data therein. The bus 59 may couple the processor 48 to the other components of the system including, for example, the memory 56, the communication unit 58, the application container 42, and the data storage 52. It will be apparent to one skilled in the art that other processors, operating systems, and physical configurations are possible.

The memory 56 may store and provide access to data for the other components of the system. In some implementations, the memory 56 may store instructions and/or data that may be executed by the processor 48. The instructions and/or data may include code for performing the techniques described herein. For example, in one embodiment, the memory 56 may store the software application to be executed by the client device. The memory 56 is also capable of storing other instructions and data, including, for example, an operating system, hardware drivers, other software applications, databases, etc. The memory 56 may be coupled to the bus 59 for communication with the processor 48 and the other components of the system.

The memory 56 may include one or more non-transitory computer-usable (e.g., readable, writeable) device, a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray, etc.) mediums, which can be any tangible apparatus or device that can contain, store, communicate, or transport instructions, data, computer programs, software, code, routines, etc., for processing by or in connection with the processor 48. In some implementations, the memory 56 may include one or more of volatile memory and non-volatile memory. It should be understood that the memory 56 may be a single device or may include multiple types of devices and configurations.

The display device 50 may be a liquid crystal display (LCD), light emitting diode (LED) or any other similarly equipped display device, screen or monitor. The display device 50 represents any device equipped to display user interfaces, electronic images and data as described herein. In different embodiments, the display is binary (only two different values for pixels), monochrome (multiple shades of one color), or allows multiple colors and shades. The display device 50 is coupled to the bus 59 for communication with the processor 48 and the other components of the system. It should be noted that the display device 50 is shown in FIG. 3 with dashed lines to indicate it is optional. For example, the client device may be operated without an associated display device.

The communication unit 58 is hardware for receiving and transmitting data by linking the processor 48 to a data network and other processing systems. In one embodiment, the communication unit 58 may include a port for direct physical connection to a data network. In another embodiment, the communication unit 58 may include a wireless transceiver (not shown) for exchanging data via a wireless network using one or more wireless communication methods, such as IEEE 802.11, IEEE 802.16, Bluetooth®, cellular communications, or another suitable wireless communication method.

The data storage 52 is a non-transitory memory that stores data for providing the functionality described herein. In the illustrated embodiment, the data storage 52 is communicatively coupled to the bus 59 to receive data for storage and provide data for retrieval upon a request for the data. The data storage 52 may store data tables and application data being processed by the client device, as will be described in more detail below.

The components of the application container 42 may include software and/or logic to provide the functionality being perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 48. In some embodiments, the components are instructions executable by the processor 48. In some implementations, the components are stored in the memory 56 and are accessible and executable by the processor 48.

In embodiments of the present disclosure, the application data transferred between the client devices and the application servers and the data stored in the centralized database are encoded using a universal data model. FIG. 4 illustrates a representation of the universal data model in some examples of the present disclosure. Referring to FIG. 4, in some embodiments, a universal data model 60 includes the following entities:

(1) Model or Data Type (62): each model defines a type of data to be stored and synchronized. For example, the data type can be an asset, a work order or the data type can be a user info.

(2) Relationship (64): the relationship entity defines how different data models are related. The relationship can be a belongs-to relationship (e.g. work order belongs to a user), or has-many relationship (a user has many work orders).

(3) Fields (66): a model may contain one or more fields, such as Field 1 to Field N, as shown in FIG. 4. Each field can contain text, numeric, or other data. Examples of fields include username, birthdate, quantity, etc.

(4) Attachment (68): a model may be associated with attached files, which can include photos, signatures, or other uploaded files. The attachment may include one or more attached files.

(5) Indexes (70): indexes are created on the one or more fields, relationship references or attachment references. The indexes are used to provide efficient data lookups.

In embodiments of the present disclosure, the centralized database (such as database 14 in FIG. 1) consists of data objects that are each an instance of a given data model, defined using the universal data model. In one example, a data object may contain the following attributes:

(1) Type (model)
(2) ID (128-bit universally unique identifier)
(3) Fields
(4) Belongs-to relationships references (IDs)
(5) Attachment references (IDs)

FIG. 5 illustrates a universal data model defined in XML, in one example of the present disclosure. Referring to FIG. 5, a data model 72 for assets is labeled "Asset" and includes a serial number field and a quantity field. The data model 72 further includes an attachment reference associated with a photo and an object relationship indicating that the data model 72 belongs to the "Region" model and the "Category" model. The data model 72 further includes an object relationship indicating the data model 72 has a 1:n (has-many) relationship to the model "Parts".

In embodiments of the present disclosure, the centralized database stores data objects using the universal data model. In some embodiments, the data objects stored in the centralized database may be assigned to one or more buckets. In particular, in embodiments of the present disclosure, a subset of data objects to synchronize to each user is defined in terms of buckets. A bucket groups together a set of data objects to synchronize with one or more client devices.

In some embodiments, the data sync method receives one or more synchronization rules ("sync rules") to be applied to the centralized database. For example, a developer of the application defines or specifies the sync rules for the set of data objects associated with the application. In some embodiments, a set of sync rules defines which subset of data objects belongs to which bucket and another set of sync rules defines which client device (or which user) should be synchronized to which bucket.

With the sync rules defined for an application, each data object in the centralized database belongs to zero or more buckets, and each user or client device synchronizes one or more buckets. Furthermore, multiple users may synchronize the same bucket. FIG. 6 illustrates a set of sync rules defined in XML in examples of the present disclosure. In particular, the sync rules in FIG. 6 defines several buckets of data objects. Referring to FIG. 6, the sync rules define a global bucket containing all of the application data (all data objects for the application) which is synchronized to all users or all client devices.

The sync rules in FIG. 6 further define user-specific buckets. In particular, user-specific buckets are defined for each user that has a role of "technician". In this user-specific bucket for the technician role, data objects associated with data models "model1" and "model2" are included. Furthermore, for model1—the bucket only includes data objects that have not been archived. In other examples, a user-specific bucket may be specified to contain data objects to synchronize for a single user only.

Furthermore, the sync rules in FIG. 6 further define region-specific buckets. The region-specific buckets may be specified for each geographic region (e.g. Northwest, Southwest, Central, Northeast and Southeast regions). The sync rules specify that the client device of each user synchronizes with the normal bucket for the user's particular region. Furthermore, the sync rules define what data objects are to be included in the Normal bucket. In the present example, the Normal bucket for a particular region includes the data objects for the "asset" data model, the "job" data model, and the "categories" data model in that particular region.

In some embodiments, to define buckets in the sync rules, a distinction is made between two types of buckets:

(1) Global buckets: There exists only one of each type of global bucket. Users synchronizing this bucket may be filtered by specifying a query, such as "only where admin flag is set". Objects belonging to the bucket may be filtered by specifying the models to include, as well as query criteria (e.g. "only objects where the archive flag is not set").

(2) Normal buckets: Buckets defined by a "root object". Each root object represents a separate bucket. A query is specified to find all the root objects for each user, e.g. "the region of the user", "all work orders for the user", or "the user's own object". One or more has-many relationships, along with optional filter conditions, are specified to define all the objects forming part of the bucket.

In some examples, buckets can be defined for users such as inspectors, field workers, or global admin. In other examples, buckets can be defined based on regions, such as North America admin or Colorado admin.

Figure 7:
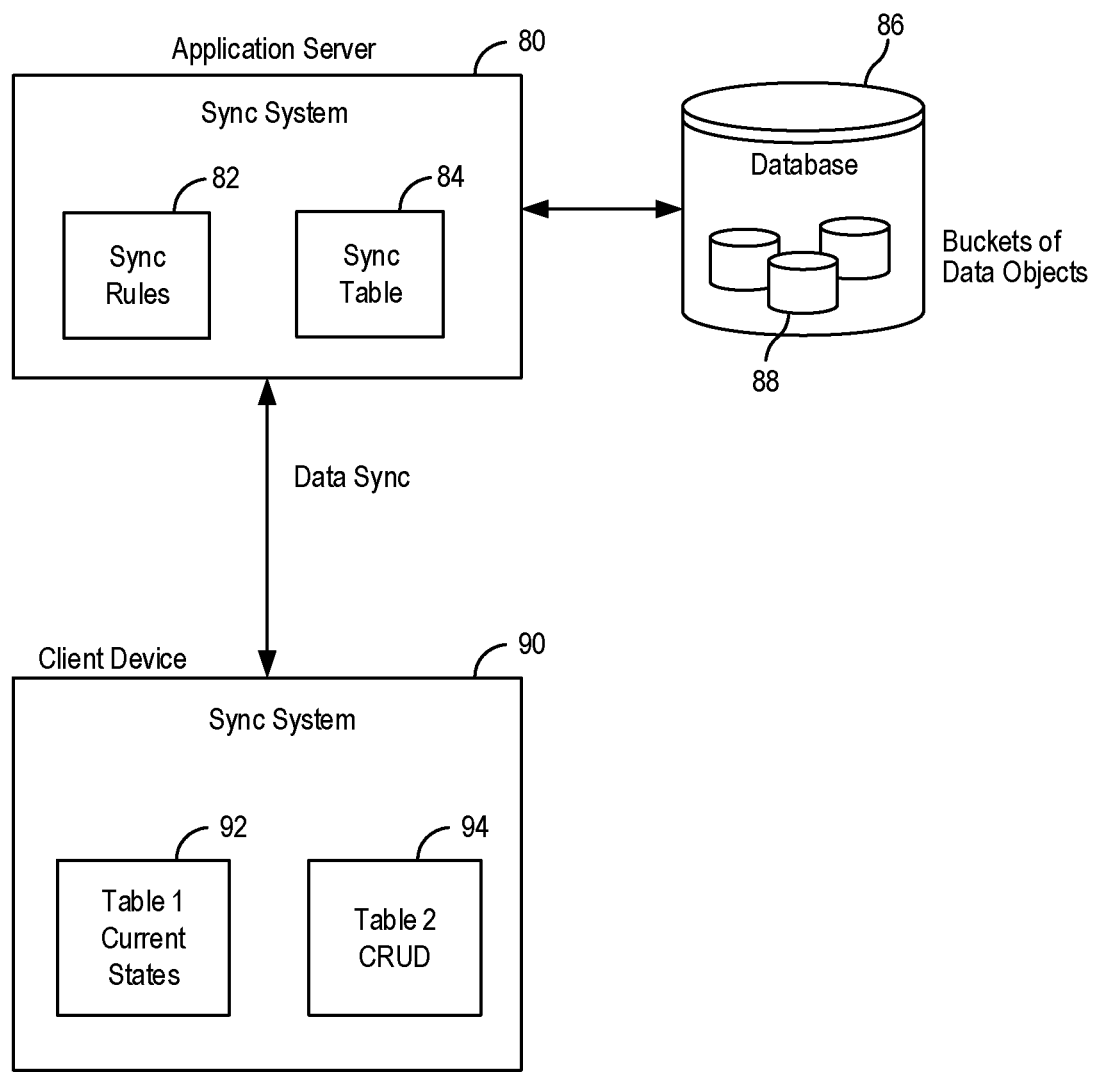
FIG. 7 is a block diagram illustrating a data sync system configuration in some embodiments.

FIG. 7 is a block diagram illustrating a data sync system configuration in some embodiments. Referring to FIG. 7, a software application is provided to be deployed and executed on a client device 90. An application server 80 is provisioned to host the backend application services of the application and is in communication with the client device 90 over a network connection. The application server 80 is in communication with a database 86 storing application data that is used or modified by the client device during execution of the application. As described above, the application data is stored in database 86 as data objects using one or more data models based on the universal data model described above. In the present description, a single client device in communication with a single application server is described. In most implementation, multiple client devices execute the application software and communicate with multiple application servers providing backend application services, as described with reference to FIG. 1. FIG. 7 is illustrative only and not intended to be limiting.

In operation, the client device 90 access the application data during the execution of the application. The client device 90 may also create new application data or modify existing application data. The client device 90 accesses the application data stored on database 86 through the network connection with the application server 80. Application server 80 execute backend application services to retrieve and provide application data to the client device. In some cases, the network connection between the client device and the application server may become unavailable. That is, the client device cannot communicate with the application server. In embodiments of the present disclosure, a data sync system is implemented to enable the client device 90 to continue to execute the application even while the client device 90 is off-line, that is, without network connectivity to the application server 80. The data sync system enables the application server 80 and the client device 90 to sync up the application data that may have changed during the period of off-line operation.

In embodiments of the present disclosure, the software application defines application data using data models based on the universal data model described above. For example, each data model is defined by fields, relationships and attachments. The software application also define synchronization rules ("sync rules") for the data objects. As described above, a developer of the application defines or specifies the sync rules for the set of data objects associated with the application. Using the sync rules, the data objects stored in the database 86 are organized into buckets of data objects 88. For example, a first sync rule may specify all data objects for the data model "asset" shall be assigned to buckets based on geographic regions. It is instructive to note that the bucket assignment is a logical construct only. The data objects are not physically grouped into buckets or stored together in the database 86. Rather, the sync rules define which data objects should be grouped into a particular bucket and each bucket may keep track of the logical locations of the associated data objects in the database 86.

To implement the data sync system, the application server 80, providing backend application services for the software application, implements a first table 82 storing the sync rules of the software application ("the Sync Rules Table"). For instance, the Sync Rules Table 82 stores sync rules assigning the data objects in the database 86 to buckets. The table 82 also stores sync rules assigning one or more buckets to the client device 90, that is, assigning buckets that are to be synchronized with the client device. In some embodiments, each client device is assigned to at least one bucket of data objects. The application server 80 also implements a second table 84 referred to as the Sync Table. The Sync Table 84 is updated whenever any application data is changed (added, updated or removed) on the application server 80.

In embodiments of the present disclosure, the Sync Table 82 contains one entry for every data object stored in the database. In one embodiment, each entry contains the following fields:

Sequence ID (strictly incrementing based on time of the operation);
Object type (the data model of the data object);
Object ID;
Object data (fields, relationship references and attachment references);
Buckets (calculated according to sync rules);
Previous buckets (if buckets were removed by a change); and
Hash of the data.

Entries in the Sync Table 84 are generally ordered by the Sequence ID, and all operations operate on a Sequence ID range (minimum and maximum Sequence ID).

Meanwhile, the client device 90 implements the data sync system using two data tables. The client device 90 implements a first table 92 ("Current States") being a local copy of the buckets assigned to the client device 90. The Current States Table 92 stores the current states of all the data objects associated with the client device. For instance, the Current States Table 92 may store each data object in an entry using the fields: ID, Data Type, Sequence ID, Hash, and Data (fields, relationship references and attachment references). A salient feature of the data sync system and method of the present disclosure is that the entire dataset associated with the application is not replicated onto the client device. Rather, the client device only receives a subset of replicated data that is assigned to the client device. The subset of replicated data is organized as buckets of data objects. By replicating and synchronizing application data based on buckets of data object, the sync system and method of the present disclosure achieves greater efficiency and reduced implementation cost.

The client device 90 further implements a second table 94 ("CRUD") containing the CRUD queue which is used to store local changes to the data objects before uploading to the application server 80. In the present description, CRUD refers to "create, read, update and delete" and refers to the operations the client device 90 may apply to a locally saved data object. Whenever the client device creates a new data object, update or modify a data object, or delete a data object, an entry is made to the CRUD table 94. In one embodiment, each entry in the CRUD table 94 contains the following fields: Auto-incrementing ID, ID, Data Type, Type of change (PUT, PATCH, DELETE), and Changes (fields, relationship references and attachment references with their new values). In the present description, PUT refers to updating a data object by providing the new data value, PATCH refers to updating a data object by providing the changes, and DELETE refers to removing the data object.

When the client device 90 is executing the application, all offline database queries at the client device are performed against the Current States Table 92. Indexes defined in the data model can be used to allow for efficient queries. Whenever application data is modified on the client device, the changes are persisted to both tables 92 and 94. That is, the Current States Table 92 is updated with the changes to the application data and the CRUD Table 94 records the incremental changes to the application data. When the client device 90 establishes network connection with the application server 80, the data sync system and method is activated to sync up the data objects between the client device and the database, through the application server.

Examples of the data tables that can be implemented in the application server and the client device are provided below for the purpose of illustration.

FIG. 8 illustrates a data table for storing the raw data in some examples. In the present description, the raw data refers to the data objects which are instances of pre-defined data models. A separate table is provided for each data model used by the software application. In the present example, the raw data table for a data model (e.g. assets) includes two attributes: (1) a unique object ID (ID) and (2) Data. In the present example, the Data attribute is given as JSON string containing the fields, relationships and attachment references.

All changes to data objects stored in the database are recorded into a separate "oplog" at the application server. The oplog contains an ordered list of entries including sequence ID, object ID, data type (or data model), Op (type of change), and Data. FIG. 9 illustrates an oplog table in some examples. An entry is added to the oplog whenever a data object in the raw data table is modified. In the example shown in FIG. 9, an entry is made for a data object of the Asset data mode. The operation is PUT (update new data) and the new data is provided in the Data attribute in the form of a JSON string containing the fields, relationships and attachment references.

In embodiments of the present disclosure, the Sync Table implemented in the application server is constructed from the oplog. The data in the Sync Table is similar to that in the oplog, but additionally contains the list of buckets for each entry, as well as a hash of the data which can be computed directly from the data in the oplog. Furthermore, the Sync Table only contains the latest data for each object ID, where the oplog may contain historical entries as well. FIG. 10 illustrates the Sync Table implemented in the application server in some examples. In the example shown in FIG. 10, the Sync Table includes the entry for the object ID shown in the oplog of FIG. 9. The data object is associated with two buckets: the Global bucket and the Region_Co bucket. The data object is also historically associated with the Global bucket, the Region_Co bucket and the Region_Tx bucket. The data attribute in the Sync Table stores the same data attribute from the oplog.

In some embodiments, the Sync Table contains indexes on the sequence ID and the bucket lists, to ensure efficient lookups according to a user's buckets and a sequence ID range.

FIG. 11 illustrates the data table for storing the current states of the data objects in the client device in some examples. As described above, the Current States table stores a replicated data set of the data objects for the buckets assigned to a particular client device. The Current States table contains a list of entries where each entry is defined by the attributes: object ID, data type (or data model), sequence ID, Hash value of the data, and Data. In the example shown in FIG. 11, an entry is made for a data object of the data type Asset and having the Data attribute in the form of a JSON string containing the fields, relationships and attachment references. The data object shown in FIG. 11 is the same data object shown in the Sync Table of FIG. 10.

FIG. 12 illustrates the CRUD queue table implemented in the client device in some examples. As described above, the CRUD table stores the local changes to the data objects on the client device. The CRUD table contains a list of entries where each entry is defined by the attributes: change ID, data type (or data model), object ID, Op (type of change), and Data. the type of change can include PUT, PATCH and DELETE. In this example shown in FIG. 12, the Op attribute is PATCH. In that case, the Data attribute includes only the part of the data that has been changed. As shown in FIG. 12, the quantity field in the Data attribute has been changed to "8" (from the value of "7" in the Current States table in FIG. 11). The Data attribute in the CRUD table therefore contains only the changed data for the object ID.

Figure 13:
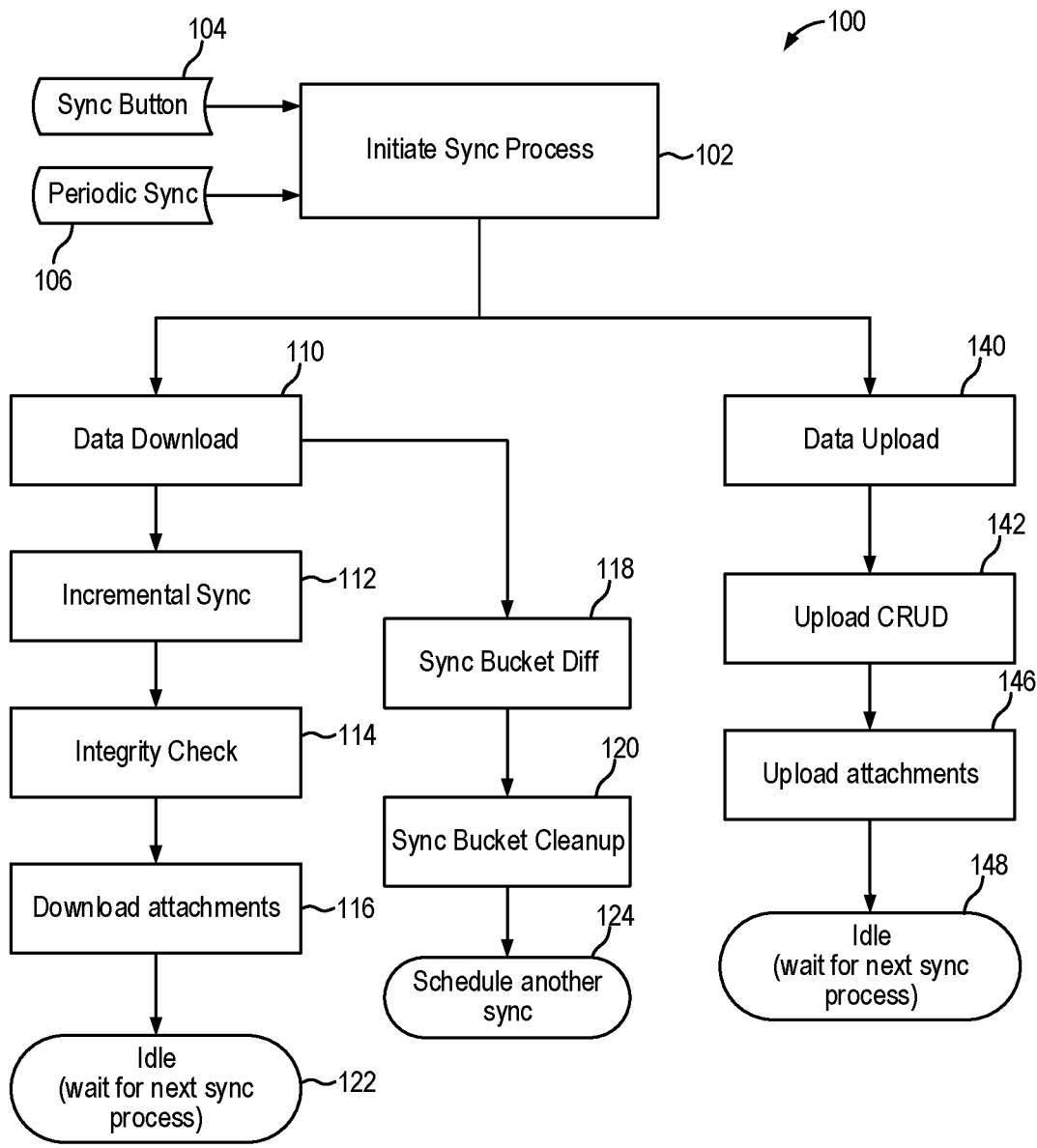
FIG. 13 is a flow chart illustrating the bidirectional data sync method in embodiments of the present disclosure.

In embodiments of the present disclosure, the data sync method is divided into two parts. The first part involves synchronizing data from the application server to the client device, also referred to as download data. The second part involves synchronizing data from the client device to the application server, also referred to as upload data. In some embodiments, the data sync method is implemented using API operations. The API operations are sometimes referred to as API calls. FIG. 13 is a flow chart illustrating the bidirectional data sync method in embodiments of the present disclosure. The client device may be executing an application while off-line, that is, without network connectivity to the application server. In that case, the client device uses the Current States table for database queries and stores changes to data objects locally in the Current States table and also in the CRUD table. When network connection is re-established between the client device and the application server, the data sync method is initiated to synchronize the data objects between the application server and the client device. In some embodiments, the data sync method may be initiated manually by the selection of a Sync button on the client device. In other embodiments, the data sync method may be initiated automatically periodically.

Referring to FIG. 13, the data sync method 100 is initiated to synchronize the application data between the application server and the client device (102). In one example, the sync process is initiated by the selection of the sync button (104). In another example, the sync process is initiated periodically (106).

The data sync method 100 performs downloading of data (110) from the application server to the client device. It is instructive to note that the application server only download data objects that belong to the buckets that are associated with the client device. In the present embodiment, the main operations for data download process includes:

(1) Incremental sync (112)—incremental sync performs data download for data objects not already stored on the client device, where the data object belongs to a bucket that is associated with the client device. The parameters of the incremental sync operation includes: Authenticated user, sequence ID range, whether or not to include deletes, optional result size limit. The incremental sync call returns all entries from the Sync Table on the application server, for the specified user's buckets, for the specified range. The incremental sync operation further returns a list of buckets for the user or the client device associated with the user.

(2) Integrity check (114)—integrity check verifies the hash values of the download data. The parameters of the integrity check operation includes: Authenticated user, sequence ID range, whether or not to include deletes. The integrity check call returns a sum of the hash of all the Sync Table entries, filtered according to the user's buckets and the sequence ID range.

(3) Download attachment data (116)—download attachment data is performed on demand, that is, when there is attachment data associated with the data object. The parameters of the download attachment data operation includes: Authenticated user and attachment ID. The download attachment data call returns the data for the specified attachment.

When the data download process is completed, the data sync method 100 returns to Idle to wait for the next sync process (122).

In some embodiments, the data download process further includes additional, optional operations, including:

(4) Sync-bucket-diff (118)—sync-bucket-diff computes the changes in the list of sync buckets assigned to the client device. The parameters of the sync-bucket-diff operation includes: Authenticated user, sequence ID range, optional result size limit, added buckets, removed buckets and unchanged buckets. The sync-bucket-diff call returns a diff value containing data objects that should be added or removed as a result of a change in the list of buckets assigned to the client device. FIG. 14 illustrates an example pseudocode which can be used to implement the sync-bucket-diff in embodiments of the present disclosure.

(5) Sync-bucket-cleanup (120)—sync-bucket-cleanup computes the data objects to be removed from the client device. The parameters of the sync-bucket-cleanup operation includes: Authenticated user, sequence ID range, optional result size limit, removed buckets and unchanged buckets. The sync-bucket-cleanup call returns data that should be cleaned up or removed. FIG. 15 illustrates an example pseudocode which can be used to implement the sync-bucket-cleanup in embodiments of the present disclosure.

Returning to FIG. 13, after the sync-bucket-diff and/or the sync-bucket-cleanup operation, another sync process is scheduled (124) to update the data objects associated with the new or changed buckets or to remove data objects from deleted buckets. That is, the sync process is performed to download to the client device data objects belonging to newly designated buckets.

In embodiments of the present disclosure, the sync-buck-diff operation and the sync-bucket-cleanup operation are optional and may be included as needed to update the bucket list at the client device. In some embodiments, the sync-buck-diff operation is performed before the sync-bucket-cleanup operation. In other embodiments, the sync-buck-diff operation can be performed without the sync-bucket-cleanup operation. Alternately, he sync-buck-cleanup operation can be performed without the sync-bucket-diff operation.

The data sync method 100 further performs uploading of data (140) from the client device to the application server. In the present embodiment, the main operations for data upload process includes:

(1) Upload CRUD (142)—upload CRUD is performed for the recorded operations in the CRUD table in the client device. The parameters of the upload CRUD operation includes: Authenticated user and sequence of operations. The upload CRUD call returns an "acknowledgement" indicating successful upload or "error" indicating unsuccessful upload.

More specifically, the sequence of operations parameter is an ordered list of the following operations:

1. PUT: Create or replace a data object with a given ID, data type (model) and data.
2. PATCH: Update an existing data object with a given ID, data type, and set of changes.
3. DELETE: Remove a data object with a given ID and data type.

(2) Upload attachment data (146)—upload attachment data is performed on demand that is, when there is attachment data associated with the data object to be uploaded. The parameters of the upload attachment data operation includes: Authenticated user, attachment ID, attachment data. The upload attachment data call returns an "acknowledgement" indicating successful upload or "error" indicating unsuccessful upload.

When the data upload process is completed, the data sync method 100 returns to Idle to wait for the next data upload process (148).

In embodiments of the present disclosure, the application server additionally exposes a REST API. This is not considered part of the data sync system, but REST API allows the client device to execute queries against the application server directly, instead of against the offline database, if required. The queries are based on the same universal data model, which means the queries do not have to change when switching between the local database or the REST API, as described above.

Figure 16:
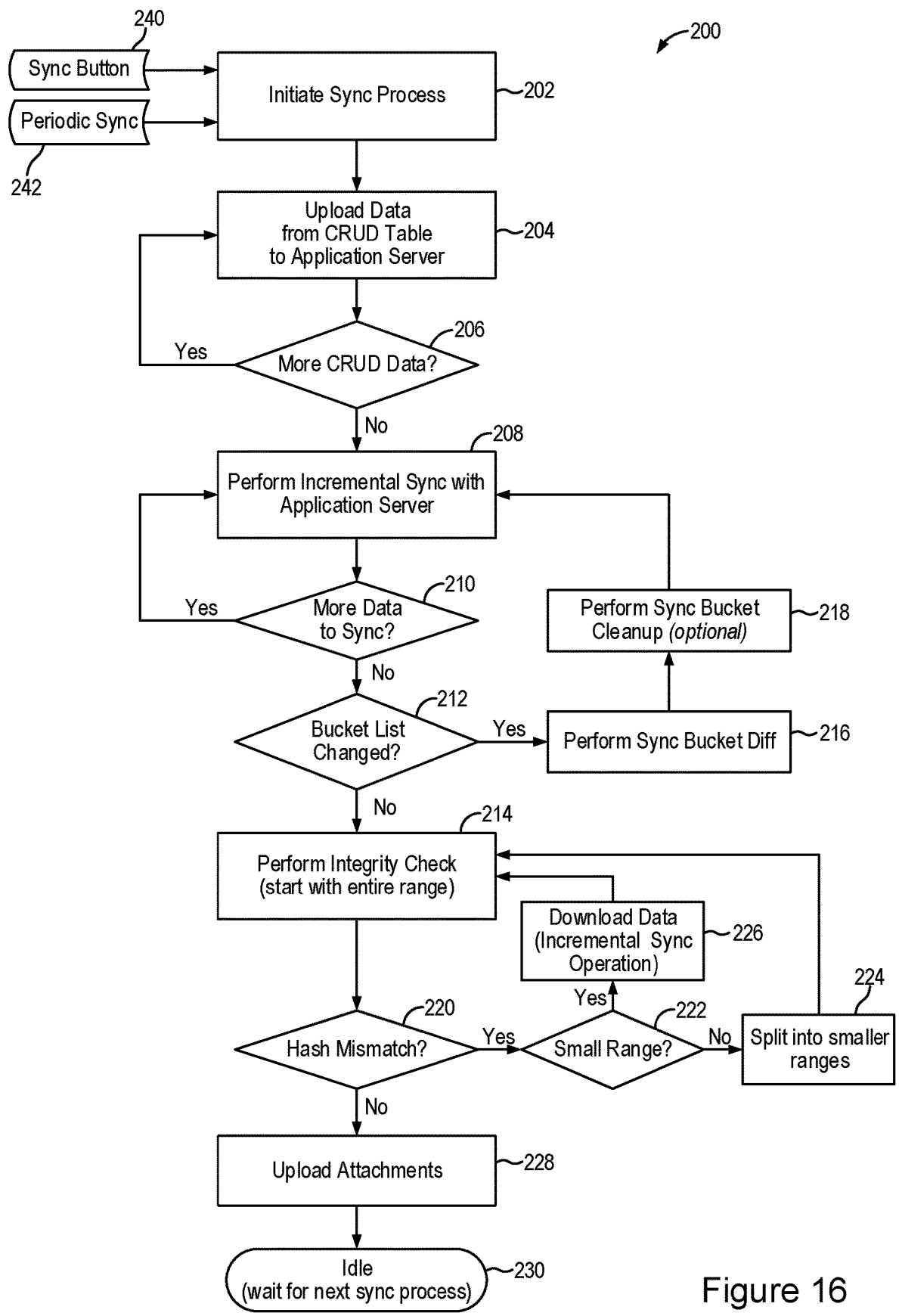
FIG. 16 is a flowchart illustrating a client-side data sync method implemented on the client device executing an application in some embodiments.

FIG. 16 is a flowchart illustrating a client-side data sync method implemented on the client device executing an application in some embodiments. Referring to FIG. 16, the data sync method 200 initiates the sync process (202), such as by selecting a sync button on the client device (240). Alternatively, the sync process can be performed periodically (242). In some embodiments, the data sync method 200 is initiated after the client device has re-established network connection with an application server, after a period of no network connectivity.

Upon activation of the sync process, the data sync method 200 uploads data from the CRUD table to the application server (204). The method 200 continues to upload the CRUD data until all of the CRUD data has been uploaded (206). The method 200 then performs an incremental sync by making a network request to the application server (208). In some embodiments, the incremental sync operation updates the data objects in the Current States table of the client device. In particular, the incremental sync operation updates all the data objects belonging to the buckets assigned to the client device. In some embodiments, the incremental sync operation also updating the list of buckets to be synced to the client device. The incremental sync process continues until all the data objects have been synchronized (210). In some embodiments, the data sync method 200 adds data objects to be synchronized as missing range. The incremental sync operation is repeated until all the missing range has been synchronized.

The data sync method 200 continues to determine if the bucket list for the client device has changed (212). In the event that the bucket list for the client device has changed, the data sync method 200 performs a sync-bucket-diff operation (216) by making a network request to the application server. Then, in some embodiments, the data sync method 200 may optionally performs a sync-bucket-cleanup operation (218) by making a network request to the application server. With the bucket list updated, the data sync method 200 then return to perform the incremental sync operation (208). The sync-bucket-diff operation, the sync-bucket-cleanup operation, and the incremental sync operation are repeated until the bucket list for the client device has been updated and all the data objects in the buckets have been synchronized to the data objects in the centralized database.

The data sync method 200 then performs an integrity check (214) by making a network request to the application server. The integrity check process starts with the entire range of sequence ID. The data sync method 200 determines if there is any hash mismatch (220). If there is no hash mismatch, the data sync method 200 proceeds to upload attachments to the application server (228). If there is a hash mismatch, the data sync method 200 determines whether the mismatch is within a small range of sequence ID (222). If the hash mismatch range is small, the data sync method 200 initiates the data download operation by making a network request to the application server (226). The download data operation may be performed as part of the incremental sync operation. If the hash mismatch range is large, the method 200 splits the mismatch range into smaller ranges (224) and repeat the integrity check operation. In this manner the data sync method 200 search for the hash mismatch within a small range of sequence ID and then performs the data download operation. The data sync method 200 continues until no hash mismatch is found.

In some embodiments, hash mismatches can be added as missing range or dirty range and the data sync method 200 repeat the sync process until all the missing range or dirty range of sequence ID have been resolved.

Database Query System

As described above, the application server provides a REST API to allows the client device to execute queries against the application server directly, instead of against the offline database. In embodiments of the present disclosure, a query system based on the universal data model is implemented. As thus configured, the same query system can be used in multiple places, including: (1) from the client application to the local (offline) database; (2) from the client application to the online backend database; and (3) from a server-side integration to the online backend database.

In some embodiments, queries are defined in the JavaScript language and generally follow the following pattern:

DB.<model>.where("field1=? AND field2=?", value1, value2).orderBy("field1", "field2")

In one embodiment, a query consists of the following parameters:

(1) The model being queried.

(2) Filter criteria (fields and relationship references). The filter criteria could contain operators such as "equal", "not equal", "greater than", "starts with", or other comparison functions. Filter values are passed in separately to avoid SQL injection-style security vulnerabilities.

(3) Sort order: A list of fields, which can each be ascending or descending order.

(4) Limit: Maximum number of results to return.

(5) Skip: Skip the first <n> results.

(6) Include relationships: A list of belongs-to relationships to pre-fetch as part of the query, as a performance improvement.

FIG. 17 illustrates a client device data query defined in XML in one example. In the example shown in FIG. 17, the data query seeks all data objects that are non-archived assets, skipping the first 200 results and returning only 100 results. The query is made directly against the backend database, not the locally synced database (Current States table) in the client device.

The data sync system and method of the present disclosure can be readily adopted in applications to facilitate off-line operations. In some cases, application developers may build an application incorporating the data sync system and method according to embodiments of the present disclosure to enable off-line operation and bi-directional synchronization once the client device is on-line. In another example, a developer create an application using the data sync system by defining the data model (models with their fields, relationships and attachments); defining the sync rules; writing database (DB) and OnlineDB calls for the app; writing DB calls for CloudCode; and deploying the app.

An end-user uses the data sync system via an app on a phone, tablet, laptop or desktop computing device. In one example, application data is synchronized automatically when the user uses the app, clicks on the "sync" button, and/or the data sync is activated periodically.

An advantage of the data sync system of the present disclosure is the ease of use. The data sync system can be set up easily by an application developer as the developer only needs to define the database scheme and define the sync rules for assigning data objects to the buckets and assigning client devices to the buckets. The data sync system implements all the necessary functions for keeping the data in the buckets in sync between the client devices and the application server.

The invention can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The above detailed descriptions are provided to illustrate specific embodiments of the present invention and are not intended to be limiting. Numerous modifications and variations within the scope of the present invention are possible. The present invention is defined by the appended claims.

What is claimed is:

1. A method in a client device executing a mobile application, the client device being in communication with an application server over a network connection having unreliable network connectivity, the method comprising:
   exchanging data with the application server where the data comprises data objects stored in a central database in communication with the application server, the application server assigning a first group of data objects stored in the central database to no data bucket and assigning a second group of data objects stored in the central database to one or more data buckets, and the application server further designating one or more data buckets to the client device, the data buckets designated to the client device including a subset of the data objects stored in the central database;
   storing in a first table at the client device data associated with the one or more data buckets designated to the client device;
   executing, using a processor, the mobile application using the data in the first table;
   in response to the network connection not being established between the client device and the application server, storing in a second table at the client device changes to the data in the first table as a result of the executing; and
   in response to the network connection being established between the client device and the application server, performing synchronization of data with the application server, the synchronization comprising:
   uploading data stored in the second table to the application server to synchronize data objects in the central database associated with the one or more data buckets designated to the client device;
   receiving download data from the application server for new or modified data objects associated with the one or more data buckets designated to the client device;
   receiving from the application server a list of data buckets designated to the client device; and
   in response to a change in the data buckets designated to the client device, synchronizing with the application server data in the first table associated with the change in the data buckets, the first table storing data associated with all of the data buckets designated to the client device,
   wherein the synchronization further comprises:
   performing an integrity check of the data stored in the first table;
   in response to detecting a mismatch of the data, determining the range of data having the mismatch;
   in response to the mismatched data being within a small range, downloading the data from the application server; and
   in response to the mismatched data being within a large range, dividing the mismatched data into smaller ranges and repeat performing the integrity check on the divided range of data.

2. The method of claim 1, wherein synchronizing with the application server the data in the first table associated with the change in the list of data bucket comprises:
   determining the differences in the data buckets designated for the client device; and
   receiving download data from the application server associated with the differences.

3. The method of claim 2, wherein the synchronizing with the application server the data in the first table associated with the change in the list of data bucket further comprises:
   removing data associated with one or more data buckets that are no longer designated for the client device.

4. The method of claim 1, wherein the synchronization further comprises:
   uploading to the application server files or attachments associated with the data in the one or more data buckets designated to the client device; and
   receiving downloaded files and attachment from the application server associated with the data in the one or more data buckets designated to the client device.

5. The method of claim 1, wherein storing in the second table at the client device changes to the data in the first table as a result of the executing comprises:
   storing in the second table at the client device data associated with creating, reading, updating and deleting of data in the first table; and
   storing corresponding modified data in the first table,
   wherein in response to the network connection not being established between the client device and the application server, the client device accesses the data in the first table to execute the mobile application.

6. The method of claim 1, wherein the data objects comprises instances of data models specified using a universal data model, the universal data model defining a data type of the data model, one or more data fields, one or more relationship references and one or more attachment references of the data model.

7. The method of claim 1, wherein in response to the network connection being established between the client device and the application server during execution of the mobile application on the client device, updating data associated with one or more data buckets designated to the client device in the first table continually through communication with the application server over the network connection.

8. A system for performing data synchronization in a client device executing a mobile application and being in communication with an application server over a network connection having unreliable network connectivity, the system comprising:
   a hardware processor; and a memory coupled with the hardware processor, wherein the memory is configured to provide the processor with instructions which when executed cause the processor to:

exchange data with the application server where the data comprises data objects stored in a central database in communication with the application server, the application server assigning a first group of data objects stored in the central database to no data bucket and assigning a second group of data objects stored in the central database to one or more data buckets, and the application server further designating one or more data buckets to the client device, the data buckets designated to the client device including a subset of the data objects stored in the central database;

store in a first table at the client device data associated with the one or more data buckets designated to the client device;

execute the mobile application using the data in the first table;

in response to the network connection not being established between the client device and the application server, store in a second table at the client device changes to the data in the first table as a result of the executing; and in response to the network connection being established between the client device and the application server, perform synchronization of data with the application server, the synchronization comprising:

upload data stored in the second table to the application server to synchronize data objects in the central database associated with the one or more data buckets designated to the client device;

receive download data from the application server for new or modified data objects associated with the one or more data buckets designated to the client device;

receive from the application server a list of data buckets designated to the client device;

in response to a change in the data buckets designated to the client device, synchronize with the application server data in the first table associated with the change in the data buckets, the first table storing data associated with all of the data buckets designated to the client device;

perform an integrity check of the data stored in the first table;

in response to detecting a mismatch of the data, determine the range of data having the mismatch;

in response to the mismatched data being within a small range, download the data from the application server; and in response to the mismatched data being within a large range, divide the mismatched data into smaller ranges and repeat performing the integrity check on the divided range of data.

9. The system recited in claim 8, wherein the memory is further configured to provide the processor with instructions which when executed cause the processor to:

determine the differences in the data buckets designated for the client device; and receive download data from the application server associated with the differences.

10. The system recited in claim 9, wherein the memory is further configured to provide the processor with instructions which when executed cause the processor to:

remove data associated with one or more data buckets that are no longer designated for the client device.

11. The system recited in claim 8, wherein the memory is further configured to provide the processor with instructions which when executed cause the processor to:

upload to the application server files or attachments associated with the data in the one or more data buckets designated to the client device.

12. A method in an application server hosting backend application services of a mobile application being executed on a remote client device, the application server being in communication the remote client devices over a network connection having unreliable network connectivity, the method comprising:

storing data objects associated with the execution of the mobile application by the remote client device in a central database;

storing in a third table one or more synchronization rules assigning a first group of data objects stored in the central database to no data bucket and assigning a second group of data objects stored in the central database to one or more data buckets;

storing in the third table one or more synchronization rules designating one or more data buckets to the remote client device;

storing in a fourth table one or more ordered entries associated with data objects that have been modified;

in response to the network connection being established between the remote client device and the application server, performing, using a processor, synchronization of data with the remote client device, the synchronization comprising:

downloading to the remote client device modified data objects associated with data buckets designated to the remote client device, the modified data objects being identified in the fourth table;

receiving uploaded data from the remote client device, the uploaded data being associated with the data buckets designated to the remote client device;

downloading a list of data buckets designated to the remote client device in response to the one or more synchronization rules stored in the third table;

in response to a request for an integrity check received from the remote client device for data stored on the remote client device, selecting a first range of sequence ID corresponding to a range of sequence ID of the data stored on the remote client device and determining if there is a mismatch of the data stored on the remote client device and the data stored on the application server;

in response to detecting a mismatch of the data, determining the range of data having the mismatch;

in response to the mismatched data being within a small range, downloading the data from the application server to the remote client device; and in response to the mismatched data being within a large range, dividing the mismatched data into smaller ranges and repeat performing the integrity check on the divided range of data.

13. The method of claim 12, wherein the synchronization further comprises:

downloading to the remote client device files or attachments associated with data objects belonging to the one or more data buckets designated to the remote client device; and receiving, from the remote client device, uploaded files or attachments associated with data objects belonging to the one or more data buckets designated to the remote client device.

14. The method of claim 12, wherein the data objects comprises instances of data models specified using a universal data model, the universal data model defining a data type of the data model, one or more data fields, one or more relationship references and one or more attachment references of the data model.

15. The method of claim 12, wherein in response to the network connection being established between the client device and the application server during execution of the mobile application on the client device, updating data objects associated with one or more data buckets designated to the remote client device continually through communication with the remote client device over the network connection.

16. The method of claim 12, further comprising:
in response to a network request received from the remote client device, downloading to the remote client device data objects associated with data buckets that have been newly designated to the remote client device.

17. The method of claim 12, wherein storing in the third table one or more synchronization rules assigning data objects stored in the central database to no data bucket or to one or more data buckets comprising:
storing a first synchronization rule assigning a first set of data objects to a first data bucket; and
storing a second synchronization rule assigning some of the data objects in the first set of data objects to a second data bucket.

* * * * *